Sept. 25, 1956 A. E. ADLER 2,764,637

TELEPHONE SYSTEMS

Filed Oct. 3, 1952 2 Sheets-Sheet 1

INVENTOR
Adolf E. Adler
By Watson, Cole, Grindle & Watson
ATTORNEYS

Sept. 25, 1956 A. E. ADLER 2,764,637

TELEPHONE SYSTEMS

Filed Oct. 3, 1952 2 Sheets-Sheet 2

INVENTOR
Adolf E. Adler
By: Watson, Cole, Grindle & Watson
ATTORNEYS

United States Patent Office 2,764,637

Patented Sept. 25, 1956

2,764,637

TELEPHONE SYSTEMS

Adolf Erwin Adler, London, England, assignor to Modern Telephones (Great Britain) Limited, London, England, a British company Application October 3, 1952, Serial No. 313,029

Claims priority, application Great Britain October 5, 1951

9 Claims. (Cl. 179—40)

Figure 1A:
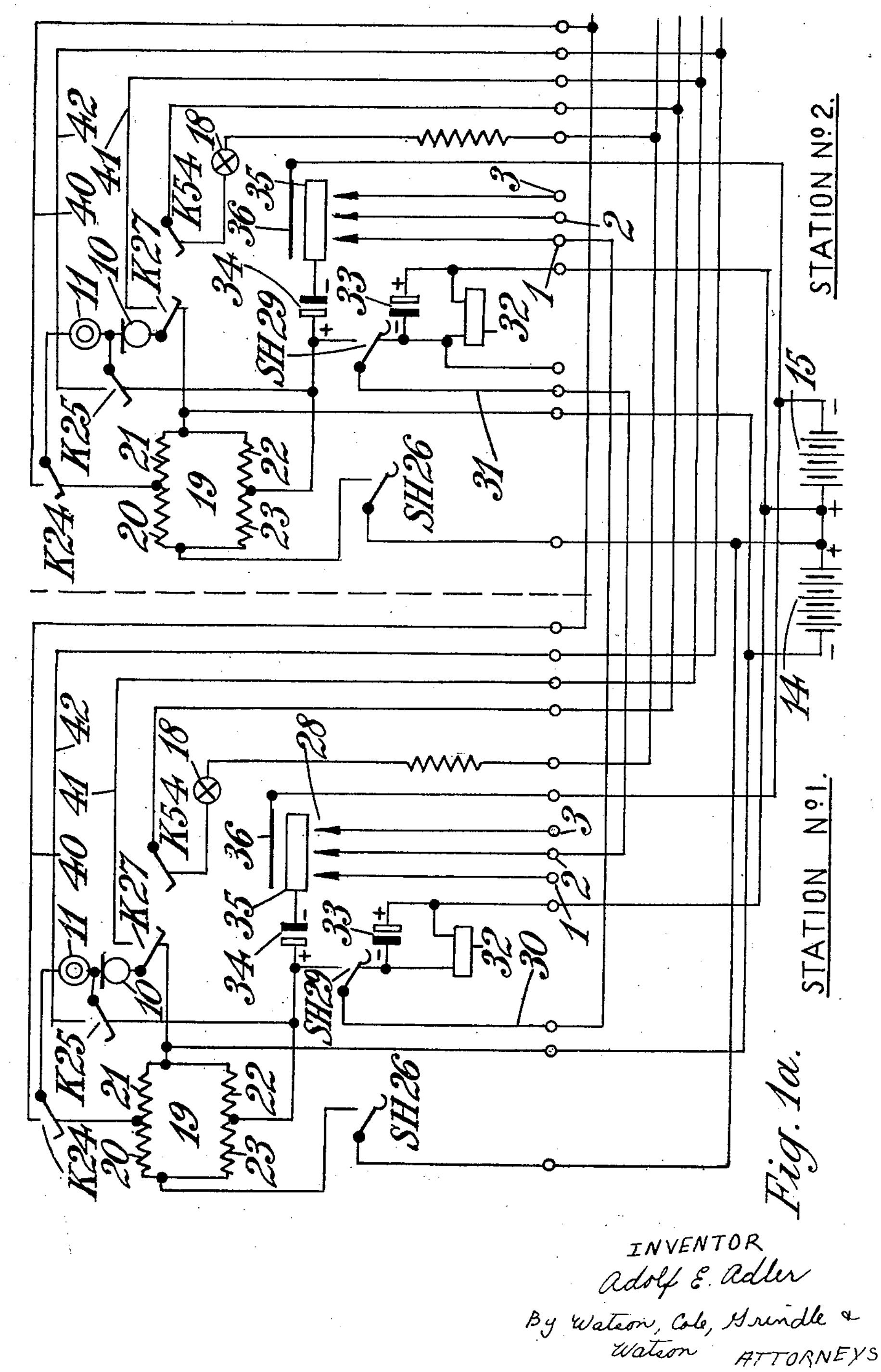

This invention relates to telephone systems of the kind in which a station having a separate transmitter and receiver is arranged for communication with one or more remote stations having a transducer which acts as a loud-speaker or as a self-energising transmitter according to the switching of amplifying means which governs the direction of amplified speech traffic along the intercommunicating lines.

In systems of this kind, it is usual for the first-mentioned station, which will hereinafter be called the controlling station, to have a manually operable talk-listen key for controlling the switching so that this station has complete control of the system. This talk-listen key is generally mounted on a handset which carries the transmitter and receiver. It will be understood that if there are a number of remote transducer stations, the controlling station would be provided also with suitable selecting means to select any required transducer station.

The principal object of the present invention is to provide a telephone system of this kind in which the necessity for any manually operated switching is eliminated but in which the controlling station still retains complete control of the system.

According to this invention, in a telephone system of the kind referred to, the amplifying means are normally switched for speech from a transducer station to the controlling station and there are provided means responsive to speech currents in the transmitter at the controlling station arranged to reverse the direction of amplification when speech currents flow in said transmitter. Thus by speaking into the transmitter at the controlling station, the speech is transmitted to the transducer station. The transducer station can reply only when no speech currents flow in the controlling station transmitter and the controlling station therefore has full control of the system.

Preferably the controlling station employs a handset transmitter and receiver as the speech currents in a handset transmitter are more uniform than in, for example, a desk microphone, and this facilitates the operation of the speech current responsive means.

Preferably the aforesaid amplifying means comprises a single amplifier and said speech current responsive means is arranged to effect switching of the input and output connections of the amplifier so as to reverse the direction of communication. Alternatively, however, the amplifying means might comprise two amplifiers for the two directions of communication respectively, one amplifier for amplifying speech currents for feeding to the loud-speaker normally being operative and the other amplifier normally being inoperative, and, in this case, the speech current responsive means is arranged to render the first amplifier inoperative and the second operative, for example, by controlling the bias of valves in the amplifiers.

The aforesaid speech current responsive means may comprise a voice-operated relay the energising current of which is supplied from a coil coupled to the operating coil of another relay connected in the speech circuit which other relay is adapted to be operated by the direct current flowing in the speech circuit from the controlling station.

The aforesaid other relay preferably has contacts arranged to act as controlling stations wherein said other relay is provided with contacts arranged to control the operation of signal lamps at the controlling stations for indicating when the relay is energised.

There may be a number of stations arranged to act as controlling stations and in this case said other relay is preferably provided with contacts arranged to control the operation of signal lamps at the controlling stations for indicating when the relay is energised and so thereby indicating that the amplifying means is engaged.

In a system having a number of remote transducer stations, to enable a controlling station to have communication with a single transducer station, the controlling station, or each controlling station if there is more than one, may be provided with selector means for operating self-holding relays to connect any selected transducer station to the amplifying means.

Figure 1B:
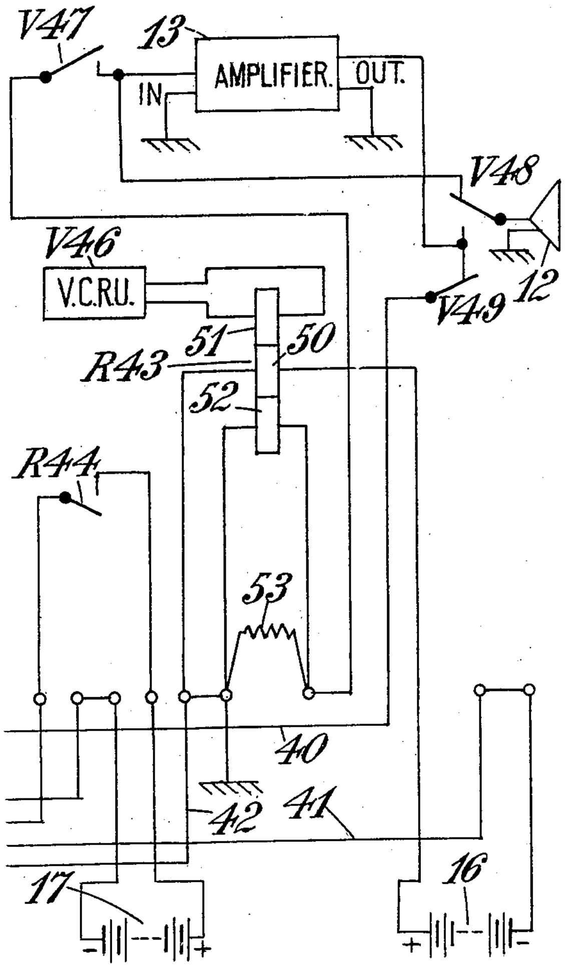

The following is a description of one embodiment of the invention, reference being made to the accompanying drawing in which Figures 1A and 1B constitute a circuit diagram of a telephone system showing two intercommunicating stations having instruments with separate transmitters and receivers and one remote transducer station.

Referring to the drawing, the stations labelled station No. 1 and station No. 2, which will be called the controlling stations, are similar and each has a transmitter 10 and a receiver 11 which may be arranged in a handset-type instrument. These two stations, as explained below, can communicate with one another or with a remote transducer station which has a transducer 12 capable of acting either as a loud-speaker or as a self-energising transmitter according to the switching of connections to an amplifier 13. The batteries (or rectifiers) for supplying the various circuits are common to all the controlling stations and comprise a talking battery 14 for the speech circuits between the controlling stations, a ringing battery 15 for the signalling circuits between the controlling stations, a speech battery 16 for the speech circuits from the transmitters 10 to the amplifier 13 and an engaged signal battery 17 for signalling lamps 18 at the controlling stations which indicate that the transducer station is engaged.

Each of the controlling stations has a bridge circuit 19, such as is described in patent specification Serial No. 2,559,778, this bridge circuit being formed of four resistors 20, 21, 22, 23. The receiver 11 is normally connected, through contacts K24, K25 of a manually operable switch referred to hereinafter as switch K, to two diagonally opposite points of the bridge 19. The talking battery is connected, through a normally open switch-hook contact SH 26 to the other pair of diagonally opposite points of the bridge 19. One side of the transmitter 10 is connected to one side of the receiver 11 and is thus normally connected through contact K25 to one point on the bridge. The other side is connected through another contact K27 to that point on the bridge 19 which is connected to the negative terminal of the talking battery 14.

A set of push-buttons 28 are provided at each controlling station, of which in the drawing Nos. 1 and 2 at stations Nos. 2 and 1 respectively are connected for calling the other two stations. It will be understood that further similar stations may be connected in a similar manner to the two shown and the appropriate number of push-buttons would be provided corresponding to the number of stations.

A second switch-hook contact SH29 over its back contact connects the home line (indicated by references 30 and 31 for stations Nos. 1 and 2 respectively) of the controlling station to one side of a buzzer 32 which is shunted by a condenser 33 for reducing interference with other lines from the buzzer. The other side of the buzzer is connected to the positive terminal of the ringing battery 15, which terminal is connected also to the positive terminal of the talking battery 14. The front contact of SH29 serves to connect the home line 30 or 31 to that point on the bridge circuit 19 which is also connected to both the transmitter and receiver. This point on the bridge is also connected through condenser 34 to a speaking bar 35 through which, by operation of the appropriate one of the push-buttons 28, connection may be established to the home line of any one of the other controlling stations. The push buttons 28 have an overthrow position in which connection is made with a common ringing bar 36 which is connected to the negative terminal of the ringing battery 15. The push buttons are mechanically arranged so that when they are released from the overthrow position, they remain locked in the normal thrown position, i. e. in contact with the speaking bar 35 until the handset is replaced whereupon the buttons are fully released.

The operation of the system for communication between the controlling stations is as follows: If one of the controlling stations wishes to speak to another, the handset at the calling station is lifted to prepare the speech circuits and the appropriate one of the push buttons 28 is pressed to the "overthrow" position. In this position the negative terminal of the ringing battery 15 is connected through the ringing bar 36 and push button to the home line of the called station. At the called station the ringing circuit is completed from the home line through the back contacts of SH29 and the buzzer 32 to the positive terminal of the ringing battery 15 and thus the buzzer sounds. On lifting the handset at the called station, the buzzer circuit is interrupted by the opening of the back contacts of SH29 and the speech circuits are completed by the closing of front contacts of SH26 and SH29, the former connecting the talking battery 14 to the bridge circuit 19 and the latter connecting the home line of the called station to the bridge circuit 19. At the calling station, release of the push button leaves it in the normal thrown position, that is in contact with the speaking bar 35, and thus the speaking circuit is completed from the bridge circuit 19 of the calling station through condenser 34, speaking bar 35, push-button, the home line of the called station and front contact SH29 of the called station to the bridge circuit of the called station. This form of speech circuit using bridge circuits at each station is described in the specification of the aforementioned patent specification Serial No. 2,559,778 and reference may be made to that specification for a full description of the speech current paths through the bridge circuits.

The present invention is concerned more particularly with the remote transducer station and its connection to the controlling stations. For communication between the controlling stations and the transducer, from each controlling station there is provided three wire speech circuit comprising leads 40, 41, 42, this speech circuit being coupled to the amplifier 13 in a manner described below. At each of the controlling stations, these three leads are connected respectively through the front contacts K24, K27 and K25 of the switch K to the transmitter and receiver so that by operation of the switch K at any controlling station, the transmitter and receiver of that station are disconnected from the bridge circuit 19 and are connected instead to the three wire speech circuit 40, 41, 42. Associated with the amplifier 13 is a direct current operated relay R43 which controls a contact R44, and a voice operated relay unit V46 which controls contacts V47, V48 and V49. The leads 41, 42 from the controlling stations are connected in series with the battery 16 and a low impedance winding 50 of the relay R43 so that the relay is energized over the speech circuit from a transmitter 10 when the switch K at a controlling station is operated. The relay R43 also has two high impedance windings 51, 52 in which alternating voltages are induced when speech currents flow through the winding 50. Winding 51 is coupled to the voice control relay unit V46 which in the well known manner, may rectify the speech currents induced in the winding 51 (after amplification, if necessary) and use the rectified speech current to control the relay for switching contacts V47, V48 and V49.

The alternating voltage developed in the winding 52 is applied across a resistance 53 which is connected, through contact V47, in shunt across the input of the amplifier 13. The contact R44 of relay R43, which contact closes when the relay is energized, completes a circuit from the battery 17 to the signal lamps 18 of the controlling stations over a further back contact K54 of the switches K at the controlling stations. Thus, when the relay R43 is energized, the signal lamps 18 will light at all the controlling stations except the one where the switch K has been operated. The transducer 12 is connected through the change-over contact V48 of the voice controlled relay unit V46 to either the input or the output of the amplifier 13, the connection being to the input except when the voice controlled relay unit is energized. The speech circuit from the amplifier to the receiver 11 of a controlling station is completed over the normally closed contact V49 of the voice controlled relay unit, the lead 40 and the front contact K24 of switch K at the controlling station, the return path being from the receiver 11 over front contact K25 to the lead 42 which is earthed.

The operation of this circuit will have been clear from the foregoing description. When a controlling station wishes to speak to the transducer station, the switch K at the controlling station is operated, so completing a circuit from the transmitter 10 through the low-impedance winding 50 of the relay R43. The operation of this relay, by the closing of contacts R44, causes the signal lamps 18 to light at all the other controlling stations, thereby indicating that the transducer station is engaged. Speaking into the transmitter 10 at that controlling station at which the switch K has been operated will operate the voice control relay unit V46 and so will cause the input of amplifier 13 to be connected to the coil 52 and the output to be connected to the transducer 12. The speech signals induced in the winding 52 from the transmitter 10 are thus amplified and fed to the transducer 12 which acts as a loud-speaker. As soon as the speech in the transmitter 10 ceases, the contacts V47, V48 and V49 of the voice controlled relay unit will revert to their normal position in which the transducer 12 is connected to the input of the amplifier 13, the output of which is connected to the line 40 and thus to the receiver R at the controlling station. Thus the transducer can act as a microphone, the speech currents being amplified and fed to the receiver at the controlling station.

It will be understood that the system is not limited to a single transducer 12. Any number of transducer stations could be connected. If there is more than one transducer station, the controlling stations would be provided with selector means for connecting a selected transducer station to the amplifier circuits. Preferably such selector means would comprise a set of push-buttons arranged to operate self-holding relays, of which there would be one associated with each transducer station.

I claim:

1. A telephone system comprising a controlling station having a separate transmitter and receiver, at least one remote station having a transducer, inter-communicating lines connecting said controlling station with said remote station, switchable amplifying means arranged in said inter-communicating lines to control the direction of amplified speech traffic along the inter-communicating lines, which amplifying means are normally switched for speech from a transducer station to the controlling station, and means responsive to speech currents in the transmitter at the controlling station arranged to reverse the direction of amplification when speech currents flow in said transmitter.

2. In a telephone system comprising a controlling station having a separate transmitter and receiver, at least one remote station having a transducer and interconnecting lines connecting said controlling station with said remote station, the combination of a single amplifier having input and output connections arranged in said interconnecting lines to amplify speech unidirectionally, switch means for interchanging the input and output connections of the amplifier to said lines to reverse the direction of amplified speech traffic, which switch means are normally switched for speech from a transducer station to the controlling station, and means associated with the amplifier and responsive to speech currents in the transmitter at the controlling station arranged to reverse the direction of amplification when speech currents flow in said transmitter.

3. A telephone system comprising a controlling station with a separate transmitter and receiver, an amplifier, a remote transducer station having a transducer capable of acting alternatively as a loudspeaker or as a self-energizing transmitter, a circuit arranged normally to couple said transducer to said amplifier and said amplifier to said receiver for feeding speech from the transducer station to the controlling station, and switching means in said circuit operable to alter the connections to said amplifier to couple said transmitter to said amplifier and said amplifier to said transducer for feeding speech from the controlling station to the transducer station, which switching means comprise a voice-operated relay responsive to speech currents in said transmitter.

4. A telephone system comprising a plurality of controlling stations each having a separate transmitter and receiver, an amplifier, at least one remote station having a transducer which acts alternatively as a loudspeaker or as a self-energizing transmitter, speech circuits associated with each of the controlling stations for connecting the receiver of any controlling station to said amplifier and for connecting said amplifier to said transducer for feeding speech from the transducer station to that controlling station, and switching means in said circuits operable to alter the connections to said amplifier to couple the transmitter of the controlling station to said amplifier and said amplifier to the transducer, which switching means comprise a first relay having an operating coil connected in the speech circuits from the transmitters of the controlling station, a pick-up inductively coupled to said operating coil, a voice-operated relay connected to be energized from said pick-up coil and switch contacts in said voice-operated relay for switching the amplifier connections.

5. A telephone system according to claim 4 wherein signal lamps are provided at each of the controlling stations and wherein said first relay is provided with contacts arranged to control the operation of the signal lamps to indicate when the relay is energized.

6. A telephone system comprising a controlling station having a separate transmitter and receiver, amplifying means, a plurality of remote stations each having a transducer capable of acting alternatively as a loudspeaker or as a self-energizing transmitter, selector means at the controlling station and interconnecting lines for selectively connecting any transducer to the amplifying means, separate circuits from the transmitter and receiver of the controlling station to said amplifying means, a voice-operated relay arranged normally to connect the interconnecting lines from the transducer to the amplifier and to connect said amplifying means to the receiver for transmitting speech from the selected transducer to the receiver, which voice-operated relay is operable to alternatively connect the transmitter to said amplifying means and said amplifying means to the selected transducer to transmit speech from the transmitter to the transducer, and circuit means coupling the transmitter to the voice-operated relay for operating the latter when speech currents are induced in the transmitter.

7. A telephone system comprising a controlling station having a separate transmitter and receiver, at least one remote station having a transducer, inter-communicating lines connecting said controlling station with said remote station, an amplifier, a relay having contacts arranged for switchably connecting said amplifier in said inter-communicating lines to control the direction of amplified speech communication along said lines, which relay is arranged normally to connect the amplifier for speech from a transducer station to the controlling station, and means responsive to speech currents in the transmitter at the controlling station arranged to energize said relay when speech currents flow in said transmitter to reverse the direction of amplification.

8. A telephone system comprising a plurality of controlling stations each having a separate transmitter and receiver, an amplifier, at least one remote station having a transducer which acts alternatively as a loudspeaker or as a self-energizing transmitter, speech circuits associated with each of the controlling stations for connecting the receiver of any controlling station to said amplifier and for connecting said amplifier to said transducer for feeding speech from the transducer station to that controlling station, a first relay having an operating coil connected in the speech circuits of the controlling stations so that the relay is energized when the speech circuit of a controlling station is completed, a voice-operated relay connected to be energized by currents in said speech circuits of the controlling stations and having contacts operable to alter the connections to said amplifier to couple the transmitter of a controlling station to said amplifier and said amplifier to the transducer when speech currents flow in the transmitter of the controlling station, signal lamps at each of the controlling stations and contacts on said first relay arranged to control the operation of the signal lamps to indicate when said first relay is energized.

9. A telephone system as claimed in claim 8 wherein, at each controlling station, there is provided switch means manually operable to connect the transmitter and receiver alternatively either to any one of the other controlling stations or to the aforesaid speech circuits to said amplifier.

References Cited in the file of this patent

UNITED STATES PATENTS

| | | |
|---|---|---|
| 2,226,891 | Baker | Dec. 31, 1940 |
| 2,352,711 | Hasenberg | July 4, 1944 |
| 2,370,388 | Baird | Feb. 27, 1945 |
| 2,477,275 | Tschumi | July 26, 1949 |
| 2,536,820 | Prahm | Jan. 2, 1951 |